(No Model.)
J. W. FITZGERALD.
CRUPPER.
No. 494,195. Patented Mar. 28, 1893.
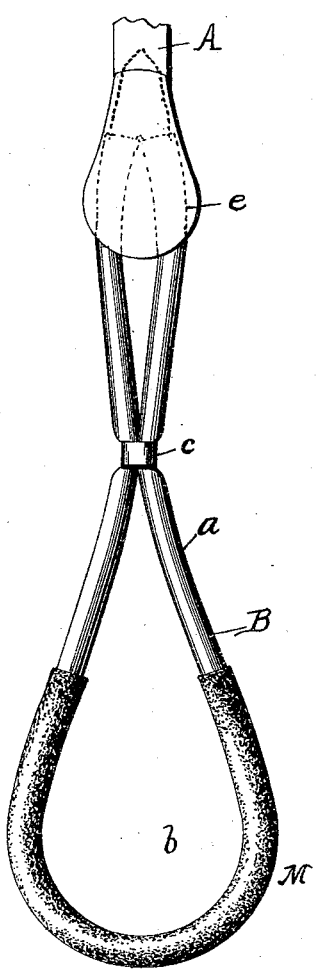
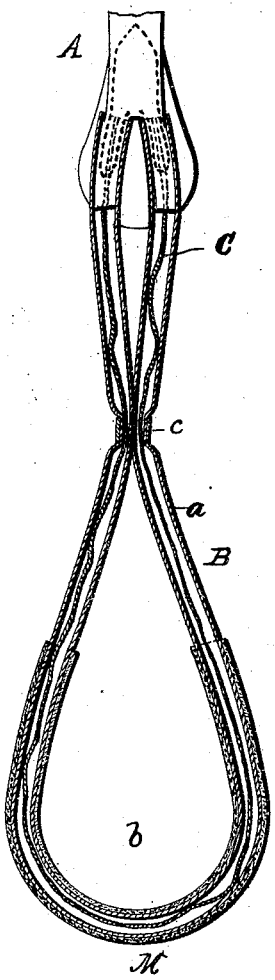
Witnesses:
C. H. Raider
Thomas E. Turpin
Inventor
James W. Fitzgerald
By James Sheehy
Attorney
THE NORRIS PETERS CO., PHOTO-LITHO., WASHINGTON, D. C.

UNITED STATES PATENT OFFICE.

JAMES W. FITZGERALD, OF MAYSVILLE, KENTUCKY.

CRUPPER.

SPECIFICATION forming part of Letters Patent No. 494,195, dated March 28, 1893.

Application filed June 13, 1892. Serial No. 436,554. (No model.)

*To all whom it may concern:*

Be it known that I, JAMES W. FITZGERALD, a citizen of the United States, residing at Maysville, in the county of Mason and State of Kentucky, have invented certain new and useful Improvements in Cruppers; and I do declare the following to be a full, clear, and exact description of the invention, such as will enable others skilled in the art to which it appertains to make and use the same.

My invention has relation to improvements in cruppers or that portion of a harness that surrounds the tail of a horse to hold the harness in position, and it is designed more especially for use upon the harness employed for holding stallion shields and the like in position, which harness, it is necessary to keep upon the horse at all times.

As is well known to horsemen the movements of the harness incidental to the motion of a horse while traveling or while moving about in a stall or field will cause the ordinary crupper to move and chafe the animal; and to obviate this objectionable movement of the crupper and the consequent chafing of the animal is the general object of my invention.

To the attainment of the aforesaid and other objects, the invention consists in the provision of an elastic crupper adapted to give to the movements of the harness so as not to be moved or otherwise affected thereby.

The invention further consists in the peculiar and advantageous construction hereinafter described and particularly pointed out in the claims appended.

In the accompanying drawings:—Figure 1, is an elevation of my improved crupper attached to the back strap of a harness and Fig. 2, is a longitudinal section of the same.

Referring by letters to the said drawings:— A, indicates the back strap of a harness which is provided with a protection strip as *e*, and, B, indicates my improved elastic crupper for taking up and giving to the movements of the harness so as to prevent chafing of the animal under the tail.

In the present embodiment of my invention, I form the crupper of a piece of rubber tubing *a*, or equivalent material which tubing has its ends connected to the back strap by sewing or other suitable means so as to form the loop *b*, designed to receive the tail of the horse. This loop *b*, may be increased or diminished in size by adjusting the band *c*, which is preferably formed from rubber or equivalent material and is mounted upon the crupper as shown.

Arranged within the tubing *a*, is a non-elastic cord or tape C, which is of a greater length than the said tubing and has its ends connected in a suitable manner to the back strap, so that it will serve to limit the expansion of the rubber tubing and take the strain off the same.

M, indicates a cover, which is placed upon that portion of the tubing *a*, which rests under the horse's tail, and is designed to absorb the perspiration and prevent the same from rotting the rubber. This cover M, may be formed from any suitable material, but I prefer in practice to form it of wool which is not only well adapted to the purpose but is comfortable to the animal. The protection strip *e*, before mentioned, rests upon the back of the horse immediately in advance of the tail and serves to prevent the tubing *a*, from coming in contact with the body of the animal. Thus it will be seen that the tubing *a*, is thoroughly protected from damage resulting from perspiration.

From the foregoing description it will be seen that in practice, that portion of the crupper having the cover M, will rest comfortably beneath the horse's tail, while the forward portion of said crupper is adapted to expand and contract so as to effectually prevent the movements of the harness from moving the crupper beneath the animal's tail.

In the practice of my invention I do not desire to be confined to the construction and arrangement of parts herein illustrated and described, as such changes or modifications may be made as fairly fall within the scope of my invention.

Having described my invention, what I claim is—

1. As an improved article of manufacture, a crupper comprising a piece of tubular, elastic material having its ends connected to a back strap of a harness, and a non-elastic cord or tape of a greater length than the tubular, elastic piece arranged loosely within the said tubular elastic piece and having its ends connected to the harness back strap, substantially as and for the purpose set forth.

2. As an improved article of manufacture, a crupper comprising a piece of tubular, elastic material having its ends connected to a back strap of a harness and an elastic band mounted upon the crupper and adapted to be adjusted to increase and diminish the size of the crupper loop, substantially as specified.

3. As an improved article of manufacture, a crupper comprising a piece of tubular, elastic material having its ends connected to a back strap of a harness, a non-elastic cord or tape of a greater length than the tubular, elastic piece arranged loosely within the said tubular elastic piece and having its ends connected to the harness back strap, and an elastic band mounted upon the crupper and adapted to be adjusted to increase and diminish the size of the crupper loop, substantially as and for the purpose set forth.

In testimony whereof I affix my signature in presence of two witnesses.

JAMES W. FITZGERALD.

Witnesses:
J. N. KEHOE,
M. T. KEHOE.